United States Patent
Han et al.

(10) Patent No.: US 7,845,203 B2
(45) Date of Patent: Dec. 7, 2010

(54) PREPARATION METHOD OF LAMINATED COMPOSITE MATERIALS OF DIFFERENT ALLOYS

(75) Inventors: Enhou Han, Shenyang (CN); Xibo Liu, Shenyang (CN); Rongshi Chen, Shenyang (CN)

(73) Assignee: Institute of Metal Research Chineses Academy of Sciences, Shenyang (CN)

( * ) Notice: Subject to any disclaimer, the term of this patent is extended or adjusted under 35 U.S.C. 154(b) by 413 days.

(21) Appl. No.: 11/902,647

(22) Filed: Sep. 24, 2007

(65) Prior Publication Data

US 2008/0276681 A1  Nov. 13, 2008

(30) Foreign Application Priority Data

May 9, 2007  (CN) ..................... 2007 1 0011226

(51) Int. Cl.
*B21C 23/00* (2006.01)
(52) U.S. Cl. ....................... 72/253.1; 72/364
(58) Field of Classification Search ............... 72/253.1, 72/257, 258, 270, 272, 342.8, 363, 364; 148/527, 148/535, 536, 537; 428/548, 567
See application file for complete search history.

(56) References Cited

U.S. PATENT DOCUMENTS

| | | | | |
|---|---|---|---|---|
| 3,837,066 A * | 9/1974 | Mori et al. | ..................... | 29/599 |
| 5,353,639 A * | 10/1994 | Brookins et al. | ............... | 72/363 |
| 5,600,989 A * | 2/1997 | Segal et al. | ................. | 72/253.1 |
| 5,904,062 A * | 5/1999 | Semiatin et al. | ............ | 72/253.1 |
| 6,399,215 B1 * | 6/2002 | Zhu et al. | ................... | 428/544 |
| 6,723,187 B2 * | 4/2004 | Segal et al. | ................. | 148/538 |
| 6,908,517 B2 * | 6/2005 | Segal et al. | ................. | 148/559 |
| 6,946,039 B1 * | 9/2005 | Segal et al. | ................. | 148/400 |
| 6,976,380 B1 * | 12/2005 | Hartwig et al. | ............. | 72/253.1 |
| 7,017,382 B2 * | 3/2006 | Segal et al. | ..................... | 72/256 |
| 7,296,453 B1 * | 11/2007 | Oruganti et al. | ............ | 72/253.1 |
| 7,544,259 B2 * | 6/2009 | Funaki et al. | ............... | 148/683 |

* cited by examiner

*Primary Examiner*—Edward Tolan
(74) *Attorney, Agent, or Firm*—Smith, Gambrell & Russell, LLP (57) ABSTRACT

The invention relates to a new preparation technique of composites, in details, i.e. a method of producing laminated composite materials of different alloys. In the preparation method, the bi-layer or multi-layer composites are prepared by means of the equal channel angular extrusion/pressure (ECAE/ECAP). Firstly, the appropriate alloys pairs or groups are selected, and the rational arrangements are carried out after pre-treating surfaces; then, the clad process is performed by extrusion and shear deformation in ECAE die; finally, the composite material is produced after one single pass or multiple passes clad extrusion. The annealing treatment can be performed subsequently to enhance the interfacial bonding strength by diffusion after the clad extrusion, and the heat treatment parameters consist of annealing temperature and holding time, which are chosen carefully to meet the demands of the refining microstructures and good properties for both the interfaces and individual component metals. Consequently, the layer-metal composite is produced with the firmly bonding interface, good microstructures and excellent properties. In the invention, the selection and assembling manners of the materials are very free, such as composites with bi-layer or interval multi-layer manners, and the method is suitable for most of the metal materials. The invention is a new method of fabricating composites and the preparation cost is low enough to meet the demand of large-scale industrial production.

15 Claims, 6 Drawing Sheets

PREPARATION METHOD OF LAMINATED COMPOSITE MATERIALS OF DIFFERENT ALLOYS

TECHNICAL FIELD OF THE INVENTION

The invention relates to the fabricating technique of laminated composite material of different alloys, particularly to the method of producing bi-layer or multi-layer composites of different alloys by means of the equal channel angular extrusion (ECAE) die. The invention is a new method of fabricating composite material, which utilizes the combining effects of extrusion and shear deformation by ECAE.

BACKGROUND OF THE INVENTION

The equal channel angular extrusion/pressure (ECAE/ECAP) technique had been developed for twenties years, which provides novelty and effective means for producing ultrafine-grained materials with extraordinary mechanical properties. The mechanism is that the billets pass through two equal cross-section channels with intersecting at an angle by extruding, where the pure shear deformation takes place severely, and an intense plastic strain is introduced into the billets without changing the cross-section area; the considerable total strain can be obtained in a bulk material by the accumulating effects after repeatedly extruding, and the grain sizes are significant refined which results in micron-size or even submicron-size grains in the materials.

The ECAE technique has so far been mainly applied for experimentation and research work, and is mainly used as improving properties, increasing deformability, investigating the superplastic behaviors or the evolutions of microstructures and anisotropy.

Utilizing the unique characteristic of ECAE, appropriate different alloys are selected and carried out clad extrusion forming by means of ECAE, and the method enables alloys grains refining and enables ductility improving. Since the clad extrusion of the billets are performed accompanying by heating, the bonding of the clad interfaces is considerable reliable via diffusing process. At the same time, the dimensions of billets can be controlled accurately by means of ECAE, so the composites with exact dimensions are produced. Making use of the technical characteristic of ECAE, the layer-metal composites using different alloy systems are promising to develop, such as Mg, Al, Zn, Ti, Cu, Fe and their alloys as well as steel, etc, and different kinds of composite materials can be prepared utilizing the combining of these materials.

The advantages of the ECAE technical have attracted widely attentions in the industries, some industry applications are being explored and developed at present, and definite progresses has been made, such as the continuous confined strip shearing (C2S2) process based on ECAE is reported by Lee et al., where the strip is carried out continuous shearing by ECAE following rolling, so the metallic sheets are produced in a continuous mode and in a repeatable manner; in addition, the ECAE equipment with moving walls provides a direction for producing large dimension productions; while a new ECAE method with rotary-die remarkably simplified the difficulty of loading and unloading die process time after time, which permits a new extruding cycle to follow without billet removal and reinsertion. Obviously, ECAE technique is gradually developing to industrial applications.

As the rapidly development of aerospace, automobile industries, chemistry industries, architecture and electron industries, more and more rigorous properties demanding for the materials are required, and the conventional simplex materials encounter more and more difficulties in meeting the demands of the mechanical, chemical and electromagnetism properties aspects. While the composite materials not only combine the advantages of individual component materials but also possess some special functions which the simplex material is not possessing. So the composite materials pioneer one new approach of designing and producing materials, and have been widely applied in many industry technology fields. While the key of composite preparation stems from the development of cladding technique. The usual methods for fabricating composites mainly consist of cast, extrusion, roll cladding, explosive welding and explosive welding+rolling cladding, etc, and the application of the explosive welding is the most extensive one.

Though these cladding techniques have been applied in the practical manufacture and each possesses its own advantages, inevitably, there also exist some disadvantages. For example, the bonding interfaces of explosive welding composites easily take place curving so as to influence the bonding strength, and the dimensions of the productions are difficult to control accurately, in addition, this method entails a high cost and has a number of limitations; clad roll materials easily bend during the producing and the preparation is complicated; while the cast compound device is complex and the clad course is found to be difficult in controlling. So the new clad technique attracts more and more attentions. Recently, there are some new types of layer-metal clad technique, such as reverse solidification, pour clad, rolling following casting clad, spray-deposited clad technique, etc, which reflects new characteristics of high efficiency, low cost, consecution and short procedure in the layer-metal clad technique, also representing the new develop direction of the clad technique. But there are still faultinesses in the new techniques, which limit their applications in the practical industry, and many technology problems need resolving.

The main disadvantages of ordinary clad extrusion are: the thicknesses of walls both inside and outside along the length direction are often unsymmetrical due to the asymmetry metal flow during the extrusion. When the discrepancy of deformation resistance between inside and outside materials is large, there easily occurs wave in shape or bamboo knot in the joint interface even breaking in hard layer, so the selection and assembling of materials are greatly limited. While utilizing ECAE technique to prepare composite material of different alloys is one kind of new approach and new method, which is also a new cladding forming technique, and there has not corresponding reports being seen up to the present.

SUMMARY OF THE INVENTION

The purpose of the invention is utilizing the ECAE technique to carry out clad extrusion, offering a kind of a method of producing composites with low cost, high reliability, simple and effective process. The composite materials after ECAE extrusion may also be used for billets, subsequently, the clad rolling can be proceeded to produce composite plates with the thinner thickness. The method of fabricating composite materials by ECAE is promising to resolve the problems existing in the ordinary clad extrusion, and that the clad manner is limited, the size precision of the production is difficult to control, the bending of billet influences the bonding quality, the device is complex and the clad process is difficult to control, etc.

The technology program of the invention is as follows:

In the invention, after the appropriate alloys kinds are selected, the thickness ratios and location arrangements of different materials are designed, the layer-metal composite materials with excellent comprehensive properties are prepared by ECAE. For example, the Al/Mg alloy composite material with Al on the surface and Mg alloy in the core can improve the material comprehensive properties by utilizing the advantages of Al. In addition, making use of high plastic or superplastic material can improve the machining properties of the composites, or producing superplastic composites, or producing high comprehensive properties composites to realize the mutual offsets between the different alloys.

Composites of the invention are prepared by the ECAE die, the superiority is mainly summarized as follows:

Since the composite process is carried out without or with weak oxidation reaction during the combination and undergoes certain pressure as well as high temperature, the materials are imposed compressive stress and shear stress, which enables the combining surfaces between the layers realizing real contact and enables the interfaces bonding well, as a result, meeting the demands of preparing layer-metal composite materials; furthermore, after ECAE cladding, the material grains refine and ductility improves; in addition, due to the materials flow uniformly during extrusion and the section-cross retain nearly unvaried after extrusion, the dimensions can be controlled relative precisely and the billet with exact dimensions also can be produced; moreover, if the grain sizes are not claimed, and only the bonding between the layers is demanded, the ECAE technique is promising to become one kind of new technique of producing large dimension composites in industry, and is prospected to compete with the clad rolling and extrusion composite in future.

In the invention, the selection and arrangement in pairs or groups of materials are comparatively free, while the different metal materials are combined in the manner of bi-layer or interval multi-layer, and the clad process is carried out in the ECAE die; then, annealing treatment is performed to enhance the interfacial bonding, subsequently, clad rolling also can been carried out to produce the needed composite plates.

ECAE in the invention is employed as a method for producing bi-layer or multi-layer composites. Firstly, the appropriate alloy systems are selected and arranged after removing the surfaces; then, the clad extrusion is carried out by means of the compressive stress and shear deformation in the ECAE die. After the extrusion, according to the practice requirement, the composites are successively annealed to enhance the bonding strength of the interfaces by diffusion, and the annealing temperature and time are selected carefully in order to optimize the microstructure and properties of the component layers and interfaces, as a result, the layer-metal composite materials are produced with substance interface combination, good microstructure and excellent properties.

By means of the ECAE in the invention, the technique of producing composites consists of the design of components and microstructure, the design and application of the ECAE die, the pretreatment and arrangement of billets, the control of composite process, the annealing treatment and rolling of composites, etc. The main process is summarized as follows:

1) The appropriate alloy systems are selected and optimized according to the requirement and the properties of component alloy. After pre-treating the surfaces, the combination between the alloys is realized by the extrusion and shearing plastic deformation in the ECAE die. In general, the oxidation layer retard interfaces combining, and the surfaces with which can not be combined easily; only the oxidation film breaking and the fresh metal surfaces occurring as well as contacting each other, the combination of different alloys can take place. The thinner and the brittle the oxidation films are, the easier cladding is carried out. On the contrary, if the oxidation film is tough and is easily deformed, it will easily flow following the matrix metal and the new surface is difficult to occur, so the interfacial combination is difficult. The proper pretreatment needs carrying out to remove the oxidation film, subsequently, the metal or alloys are bonded together even to metallurgical state after undergoing definite compressive stress at high temperature.

Prior to the extrusion the combining surfaces of billets need pre-treating, they are degreased and treated to remove contamination and oxidation layer by means of mechanical methods (for example, using grinding wheel, wire brush or sand paper, etc.), liquid baptism methods (such as using add, alkali or alcohol solution, etc.), physical or chemical methods, etc; after pre-treating, the clean interfaces combining with definite coarseness are obtained, which favors more new points to contact and facilitates the bonding of the interfaces. In addition, chemistry or electrochemistry coat plating methods are used to plate a layer of film to aid cladding. On the other hand, the composite extrusion can also be carried out directly without the surface treatment.

2) The ECAE die is lubricated with a little lubricating power or lubricating oil to reduce the friction between the die and the billets, then, enough force is pressed to produce the plastic shear deformation; the extrusion temperature is controlled to avoid or reduce forming intermetallic compound. For the metal systems with bad clad properties each other, the transition metal layer may be added to the interface to facilitate and increase bonding strength. The composite extrusion can be carried out one pass or multi-pass, the direction and orientation of next pass extrusion are same to the first pass (i.e. route A), or rotating 90-360° about its longitudinal axis between consecutive passes, which is identical with route Bc or route C. The width of each layer material is same to that of the ECAE die, and the total thickness of all assembled components is also identical with that of the die, the ratios of layer thickness may be selected freely, but the optimum ratios are in the range of 1:1-100:1.

Figure 1:
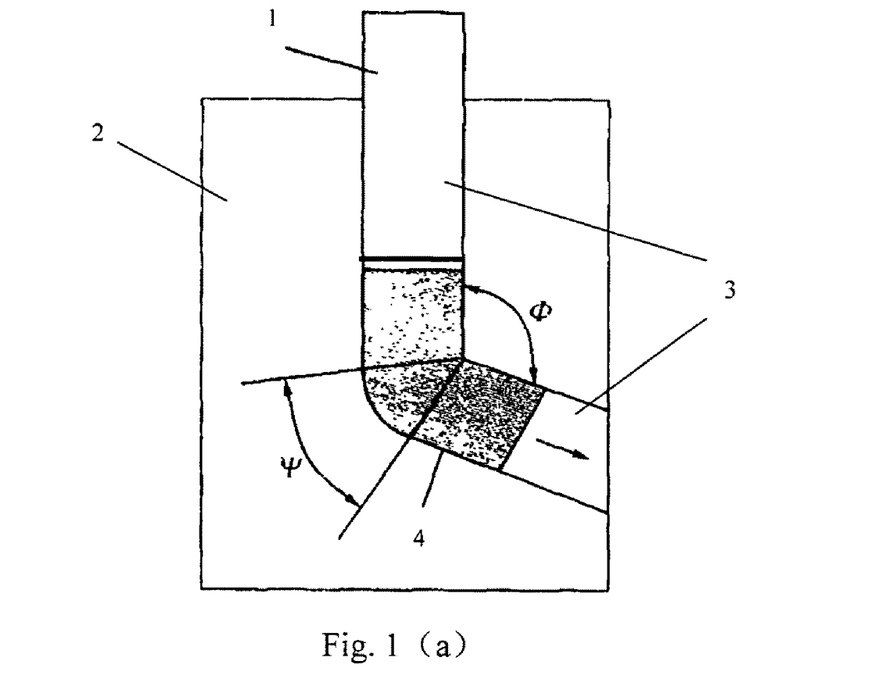
Figure 2:
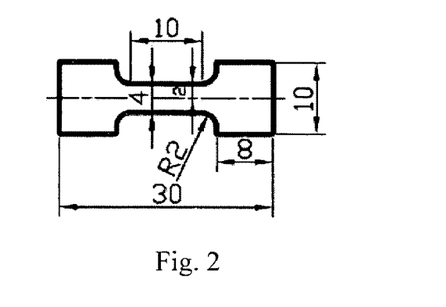
FIG. 2 is the schematic drawing of the specimen used in the superplastic tensile tests (unit mm) in Example-2, whose thickness and gauge length are 2 mm and 10 mm, respectively.

The combining ECAE die of the invention includes: punch, die body, equal cross-section channel, etc, the intersecting angle is in a range of 50-170°. The die is equipped with heating and controlling temperature device, and the die temperature is monitored with a thermocouple inserted in the die. The schematic drawing of the ECAE die is shown in FIG. 1, the width and thickness of the ECAE die are in the range of 5-2000 mm, the height range is from 20 to 5000 mm. The cross-section of the ECAC body can be different shapes, such as square, rectangle, parallelogram, trapezoid or "trough" shapes, and so on. The optimum intersecting angle of the ECAE die is in the range of 90-150°, and the optimizing width and thickness ranges are from 10 to 650 mm, the preference height range is from 100 to 1000 mm, the optimum cross-section shape of the ECAE is square or rectangle.

Prior to each extrusion cycle, the assembling billet is placed in the die kept at the annealing temperature, which is from room temperature to 1000° C. and the optimal range is 200-500° C., while the holding time is 0-10 h and the optimum range is 5 min-3 h. On the other hand, the assembling billet can also be annealed using other heat equipment outside the die and then is put back into the die to perform extrusion process. The clad process and microstructure controlling of combining billets are carried out in the die, while the clad temperature range is from room temperature to 1000° C. and the optimum range is 200-500° C. The extrusion velocity is in the range of $10^{-5}$-100/s and the optimal range is $10^{-3}$-1/s.

3) According to the practical requirement, the diffusion annealing should be carried out as quickly as possible after the composite extrusion so as to reduce deposited time. The thermal diffusion or recrystallization is accelerated during the annealing treatment, and the bonding strength between the layers is enhanced. The annealing temperature is selected according to phase diagrams and in general is above the recrystallization temperature of the component. If the interval of the recrystallization temperature of the two components is excessive large, the annealing temperature can be selected an in-between value between the two recrystallization temperatures of the components. The annealing temperature is selected from room temperature to 1000° C., while the diffusion effects will be bad and the interface can not be firmly combined if the temperature is excessive low; on the contrary, the excessively high temperature results in the thick oxide layers even the brittle intermetallic phase on the interface, more pore along the interface and coarse grains in the matrixes. The annealing time can be selected for 0.5-100 h, the bonding of interfaces will be insufficient if the annealing time is too short, on the other hand, the grains will grow up or material will become excessively softening so that properties deteriorate if the time is too long. The protective atmosphere such as Ar or $N_2$ may be used during annealing treatment according to the practical requirement. The ideal composition, microstructures, properties and thickness of the transition layer can be obtained after rationally controlling composite parameters. The optimal annealing temperature and holding time ranges are from 200° C. to 500° C. and from 0.5 h to 10 h, respectively.

4) After the annealing treatment, the clad rolling can be performed subsequently. The parameters of clad rolling process in generally consist of surface pretreatment, clad rolling temperature, rolling speed, critical bonding reduction, reduction ratio per pass, the middle annealing temperature parameters and protective atmosphere, etc. In addition, the clad rolling can be performed directly after annealing treatment if the conditions are satisfied. The rolling temperature range is from room temperature to 1000° C., and the optimum range is from room temperature to 500° C. The final production sizes are reached by controlling the rolling passes and reduction ratio per pass, on the other hand, cold rolling also can be carried out if good surface quality is required.

The clad process of different alloys is realized by means of ECAE in the invention, and the microstructures can be refined and the comprehensive properties can be improved, as a result, the manufactures with high quality and exact dimensions are produced. In future, the volume-produce and consecutive-produce are promising to be realized in industry. The advantages of the invention are summarized as follows:

1) The laminated composite materials are composed of two or more materials and possess good comprehensive properties. The advantages of composites are that the combination of different physical, chemical and mechanical properties of materials can satisfy both the need of good mechanical properties and the demand of others such as electrical and corrosion properties simultaneously, at the same time, making up their each disadvantages. After optimizing and combining the properties of different components, the comprehensive properties of the composite materials are diversified. The selection and arrangement of the material are considerable freely in the invention, the arrangement with bi-layer or interval multi-layer materials can be taken, the thermal composite process is carried out in the ECAE die, then the annealing treatment is performed to facilitate the interfacial bonding, and the rolling can be also completed after the ECAE cladding according to the practical requirement.

2) The composite materials of different alloys are produced in the ECAE die, because the procedure is performed in the fixed die and undergoes high pressure as well as high temperature, the diffusion bonding occurs on the interface during the composite extrusion. At the same time, the whole shape of the composite material nearly unvaried, so the shape and precise of the material can be easily controlled.

3) The method of producing composite materials in the invention can satisfy both the need of refining grains and the demand of improving ductility, while the clad extrusion can be carried out one pass or multi-pass and the suited process range is also very wide.

4) The ECAE die is simple.

5) The method in the invention is suitable for most of the metal materials, such as Mg, Al, Ti, Cu, Zn, Ni, Fe and their alloys as well as steel, etc, they may be selected and arranged in pairs or group according to the practical requirement and the material properties.

BRIEF DESCRIPTION OF THE DRAWINGS

FIG. 1 (a)-(d) show the schematic drawing of the ECAE die.

Where 1—punch; 2—die body (equipped with heating device); 3—the equal channel; 4—billets (specimens); 5—the cross-section of ECAE die.

FIG. 6 (a)-(d) show the microstructure evolutions of the joint interfaces of Example-1 composite alloy after different annealing treatment, (a) 200° C.×1 h, (b) 2500° C.×1 h, (c) 300° C.×1 h, (d) the line SEM after 3000° C.×1 h annealing treatment.

FIG. 7 (a)-(b) show the microstructures near the joint interfaces of Example-2 composite alloy after three passes: (a) not etched, (b) etched.

FIG. 10 (a)-(b) show the microstructures of ZW61/Cu composite near the joint interface: (a) not etching, (b) etching.

DESCRIPTION OF THE INVENTION IN DETAIL

FIG. 1 (a)-(d) show the schematic drawing of the ECAE die, which consists of two channels of equal cross-section intersecting at a channel angle of "φ", and with an outer corner angle of "ψ". The magnitude of the strain depends mainly on the die angle of "φ". As shown in FIG. 1 (a), there are two equal cross-section channels 3 with an intersection φ of 50-170° in the die, while the outer corner angle of ψ is in the range of 0-170°. The equal cross-section channel 3 is smooth enough and its height is in the range of 20-5000 mm. The punch 1 is placed in an entry of the channel; after annealing, the billet 4 is extruded through an exit of the channel by means of the punch 1. The die 2 and the punch 1 are made of die steel and high-speed steel, respectively. The billets 4 are placed in the entry of the channel and then are extruded through the exit of the channel by the punch 1, which undergoes a severe shear deformation at the channel angle without varying its original cross-section area.

The cross-section shapes of the channel and billets may be square, rectangle, parallelogram, trapezoid or "trough" shapes, and so on. FIG. 1 (b) is the cross-section schematic drawing of the die: the optimum shape of the cross-section is square or rectangle, while the thickness and the width (L and W) are in the range of 5-2000 mm. FIG. 1 (c) indicates that the shape of the cross-section may also be trapezoid or triangle, etc, the sizes of a, b and c are in the range of 5-2000 mm. FIG. 1 (d) shows that the shape of the die may also be S-type, i.e. there is three equal cross-section channels, and the neighboring channels deflect with the angle of θ, which is in the range of 0-120°. The composite material accumulates big strain after two times shear deformation.

Some examples are described in detail as follows:

EXAMPLE-1

Taking Example-1 alloy as an example, the ordinary operating processes of fabricating composite materials (pure Al/AZ31 alloy) are described in detail as follows:

☐) The Compositions

TABLE 1

Alloys Composition (wt %)

| Alloy | Element content (nominal wt. %) | | | |
|---|---|---|---|---|
| | Mg | Al | Zn | Mn |
| AZ31 | Bal. | 3 | 1 | 0.3 |
| Al | — | 100 | — | — |

II) The Steps of the Composite Extrusion are Shown in Detail as Follows

1) The AZ31 alloy and commercially pure aluminum plates are firstly pre-treated to remove greasing, then the materials are smoothed on the sand paper with water; subsequently, dryness treatment is performed for all the materials.

2) The ECAE die with the cross-section area of 12×12 mm and intersection of 90° is heated to 300° C., then, the pure Al/AZ31 alloy materials with different thickness arrangements in pairs or groups are paralleled placed into the die. The width and the height of the two materials are both 12 mm and 100 mm, respectively, and their total thickness is about 12 mm, and total height is about 100 mm. The annealing and holding treatments are carried out to avoid or reduce oxidation reaction.

3) The bi-layer or multi-layer metal materials are paralleled placed into the ECAE die, and the dimensions of assembling billets are matching to those of ECAE die; after holding for 10 min at 300° C., the clad extrusion is carried out with a speed of 5 mm/min (the extrusion speed/billet height is extrusion velocity, which is about 0.0008/s in Example-1).

4) The annealing treatment is carried out for 1 h after composite extrusion, and the microstructure evolutions of cladding Al/AZ31 bimetallic sheets are investigated and compared at the temperature of 200, 250 and 300° C., respectively. The annealing procedure may be performed in the protective atmosphere, which can avoid or reduce the oxidation of the interfaces.

The oxidation layer of the composite material can be effectively destroyed and the new surface can occur by the shear deformation of ECAE, and the dose bonding between the surfaces of different alloys can be carried out via the enough pressing and plastic deformation, the diffusion accompanying by the deformation procedure can effectively enhance the bonding strength of interfaces.

III) The Microstructures after Extruding

Figure 3:
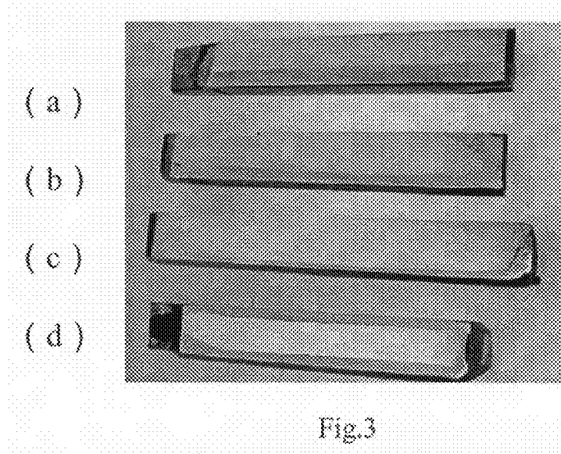
FIG. 3 is the appearance of Example-1 composite alloy (AZ31/Al) after ECAE.

The effects of different annealing conditions on the microstructures and their evolution processes have been investigated in composite Al/AZ31 bimetallic sheets:

1) After the composite extrusion by ECAE, the macrostructures of the composite materials with different combining manners are displayed in FIG. 3.

The double layer composite materials of Al/AZ31 alloy with different thickness combining: (a) 8 mm AZ31+4 mm Al; (b) 10 mm AZ31+2 mm Al; (c) 11 mm AZ31+1 mm Al; and the three-layer composite materials with the surface Al cladding the AZ31 alloy core: (d) 2 mm Al+8 mm AZ31+2 mm Al.

Figure 4:
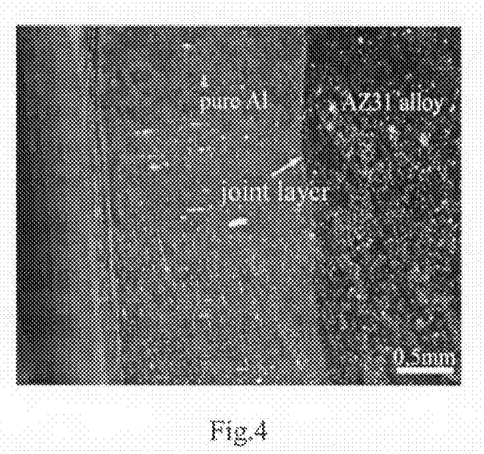
FIG. 4 is the macrostructure of Example-1 composite alloy (AZ31/Al composite alloy) after ECAE.

2) The macro-appearance of the joint interfaces: FIG. 4 shows the appearance of the double layer composite Al/AZ31 alloy, it is seen that the thicknesses of the two layer materials are comparative uniformity and the combination of the interfaces is firmed.

Figure 5:
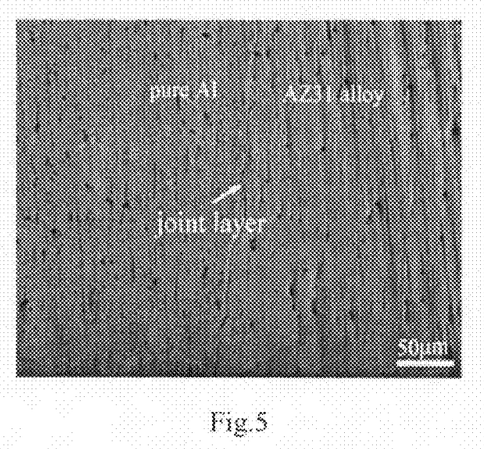
FIG. 5 is the optical micrographs of Example-1 composite alloy after composite extrusion (not etched).

3) The microstructures of the joint interfaces (not etched) after clad extruding are shown in FIG. 5, it is seen that the interfaces combine firmly and the width is narrow.

Figure 6:
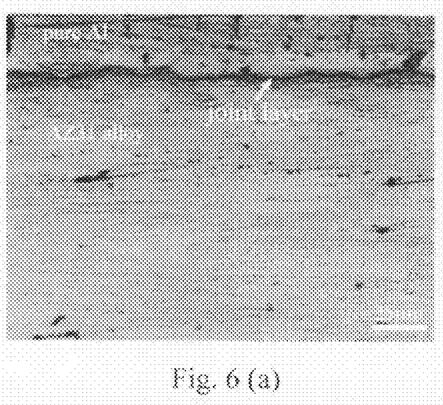

4) FIG. 6 shows the effects of various heat treatment conditions (annealing at 200, 250 and 300° C., respectively, holding time 1 h) on the microstructures and their evolution processes in Al/AZ31 bimetallic sheets. These observations suggest that the insufficient diffusion effect is achieved at low temperature such as at and below 200° C. and the bonding of the interface is not firmly; on the other hand, the grains will become coarse and the brittle compound phase will come into being if the annealing temperature is excess high.

As the annealing temperature increasing, the width of the interface diffusion layer increases and the compound phase with constant element contents occurs, as shown in FIG. 6(a), (b) and (c). There occurs content plateau-like of Al and Mg elements in the diffusion area of joint interface, as shown in FIG. 6(d), which suggests forming the intermetallic compound with constant content.

It is found that the interface combines well and the diffusion is proper after 250° C.×1 h annealing.

Obviously, by optimizing the extrusion parameters and heat treatment conditions, controlling the microstructures of the components and the interfaces, Al/AZ31 bimetallic composite materials with high bonding strength interface can be fabricated by means of ECAE.

EXAMPLE-2

☐) The Compositions

The differences between Example-2 and Example-1 mainly are as follows: two kinds of Mg alloys are used in Example-2, and the multi-pass extrusion is carried out to refine the grains of two alloys by ECAE die so as to preparation the superplastic composite materials.

TABLE 2

| | Alloys Composition (wt %) | | | | |
|---|---|---|---|---|---|
| | Element content (nominal wt. %) | | | | |
| Alloy | Mg | Zn | Y | Nd | Zr |
| WE54 | Bal. | — | 5 | 4 | 0.5 |
| ZW61 | Bal. | 6 | 1 | — | 0.5 |

II) The Steps of the Clad Extrusion are Shown in Detail as Follows

1) The WE54 and ZW61 alloy plates are firstly pre-treated to remove greasing, then the materials are smoothed on the sand paper with water, subsequently, dryness treatment is performed for all the materials.

2) The ECAE die with the cross-section area of 12×12 mm and intersecting angle of 90° is heated to 300° C., then, the WE54 and ZW61 alloy materials pairs with the thicknesses both of 6 mm are paralleled placed into the die, i.e. their total thickness is about 12 mm. The width and the height of the two materials are both 12 mm and 100 mm, respectively. The annealing and holding treatments are carried out to avoid or reduce oxidation reaction.

3) After annealing for 10 min at 350° C., the bilayer metal billets are extruded through the ECAE die with the speed of 5 mm/min (the extrusion velocity is about 0.0008/s) to complete the composite procedure.

4) The composite materials with two kinds of Mg alloys are extruded through the ECAE die for three cycles with the same orientation, order and process (i.e. route A).

5) The superplastic tensile is carried out after three-pass extrusions in a temperature range of 300-450° C. with the initial strain rate in the range of $10^{-3}$-$10^{-1}$/s.

Figure 7:
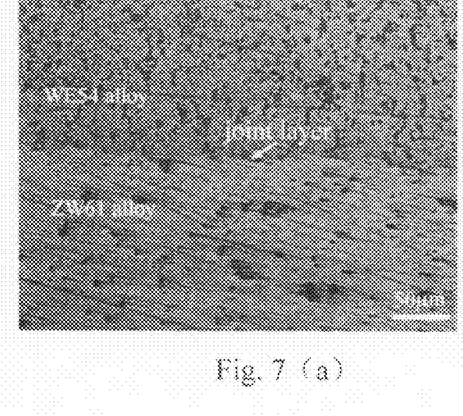

III) The Micrographs and the Properties of WE54/ZW61 Alloys after Composite Extrusion are Shown as Follows 1) The microstructure of the joint interface: FIG. 7 shows the appearance of the bimetal composite plate after mechanical polishing, it is seen that the joint interface of the two Mg alloys combines firmly; on the other hand, it is found that the grains refinement for both of two Mg alloys are observed after etching. FIG. 7 (a) shows the microstructure of the joint interface after three-pass composite extruding (not etched); FIG. 7 (b) shows the microstructures of two Mg alloys near the interface after etching, the recrystallization occurs after three-pass composite extrusion and the grains are fine.

Figure 8:
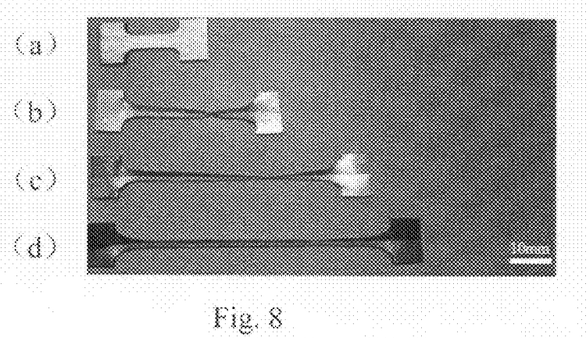
FIG. 8 shows the tensile appearances of Example-2 composite alloy with different strain velocity at 400° C.

2) The tensile deformation is performed at 400° C. with the initial strain velocity of $1 \times 10^{-1}$, $1 \times 10^{-2}$ and $1 \times 10^{-3}$/s, respectively, and FIG. 8 shows the appearances of specimens before and after tensile deformation: the upside gray section is WE54 alloy and the downside light-color section is ZW61 alloy, and the variety of color is resulted from the oxidation reaction. Obviously, the ZW61 alloy easier takes place oxidation than the WE54 alloy at the same temperature.

As shown in FIG. 8, the tensile tests of composite ZW61/WE54 material is performed, and the results are as follows: (a) not tensile specimen; (b) the elongation is above 250% at 400° C. with a initial strain velocity of $1 \times 10^{-1} s^{-1}$ and the superplasticity is obtained; (c) the elongation is above 350% at 400° C. with a initial strain velocity of $1 \times 10^{-2} s^{-1}$; (d) the elongation is above 500% at 400° C. with a initial strain velocity of $1 \times 10^{-1}$.

EXAMPLE-3

ZW61/Cu composite material prepared in Example-3, the preparation method is similar to that of Example-1, and the main different between the two examples is as follow. ZW61 alloy and pure Cu are clad at 350° C.

Figure 9:
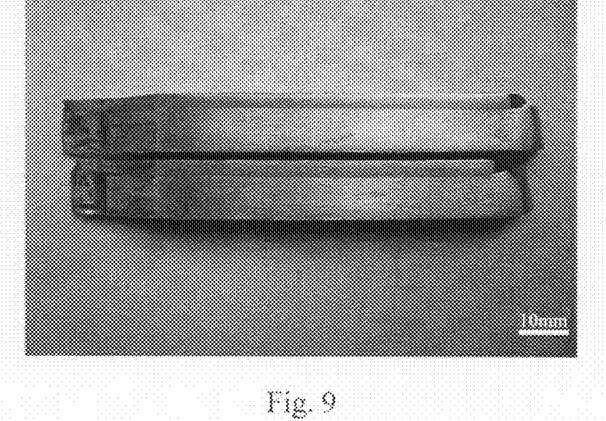
FIG. 9 shows the macrostructure of ZW61 alloy and pure Cu composite material after ECAE cladding in Example-3.
Figure 10:
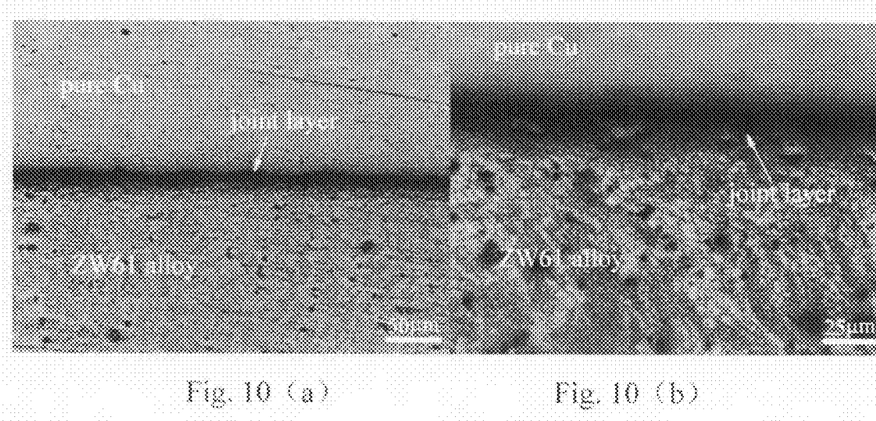

The macrostructure of ZW61/Cu composite (9 mm+3 mm) after ECAE near the joint interface is shown in FIG. 9; and the microstructure are presented in FIGS. 10a and 10b, respectively, where (a) unetching, (b) etching.

What is claimed:

1. A preparation method of laminated composite materials having bonded layers, comprising assembling metal and/or alloy billets having a longitudinal axis in an equal channel angular extrusion (ECAE) die so that the billets are parallel to one another relative to their longitudinal axes, clad extruding the assembled billets through the ECAE die to form the composite material; wherein the composite extrusion step involves one or multiple passes through the die with or without rotation about the longitudinal axis of 90-360°; and wherein the clad extrusion temperature is in the range of 200-500° C., the homogenizing time is 5 min to 3 h; and the extrusion velocity is in the range of $10^{-3}$-1/s.

2. The preparation method of laminated composite materials according to the claim 1, further comprising performing an annealing treatment to enhance an interface bonding strength after completing the clad extrusion by means of ECAE die, wherein the annealing treatment temperature is from room temperature to 1000° C. and holding time is in the range of 0.5-100 h.

3. The preparation method of laminated composite materials according to the claim 2, wherein the annealing temperature is in the range of 200-500.degree. C. after ECAE, and the holding time is in the range of 0.5-10 h; the annealing treatment can directly be performed in air, or in a protective atmosphere.

4. The preparation method of laminated composite materials according to the claim 1, further comprising clad rolling after ECAE at a temperature from room temperature to 1000° C.

5. The preparation method of laminated composite materials according to the claim 1, wherein the composite extrusion step involves one or multiple passes through the die with or without rotation about the longitudinal axis of 90-360°; and wherein the clad extrusion temperature is in the range of 200-500° C., the homogenizing time is 5 min-3 h; and the extrusion velocity is in the range of $10^{-3}$-1/s.

6. The preparation method of laminated composite materials according to the claim 1, wherein the billets are arranged in pairs or groups so that their total thickness is identical with the ECAE die width.

7. The preparation method of laminated composite materials according to the claim 6, wherein layer thicknesses ratios are in the range of 1:1-100:1.

8. The preparation method of laminated composite materials according to the claim 1, wherein the ECAE die has an intersecting angle in the range of 50-170°; is furnished with heating and controlling temperature elements has a die cavity width and thickness in the range of 5-2000 mm, and height in the range of 20-5000 mm; and a cross-section of the die cavity is square, rectangle, parallelogram, trapezium or "trough shape".

9. The preparation method of laminated composite materials according to the claim 8, wherein the intersecting angle of the ECAE die is in the range of 90-150°; the width and thickness of the die cavity are both in the range of 10-650 mm, the height is in the range of 100-1000 mm; the cross-section shape of the die is square or rectangle.

10. The preparation method of laminated composite materials according to the claim 1, further comprising pretreating the billets by mechanical, physical, chemical methods or liquid baptism technique to remove the attachments and oxides.

11. The preparation method of laminated composite materials according to the claim 3, wherein the protective atmosphere includes Ar or $N_2$.

12. The preparation method of laminated composite materials according to the claim 1 further comprising chemically or electrochemically coat plating the billets to produce an aiding clad film.

13. The preparation method of laminated composite materials according to the claim 1 further comprising heating the billets in the die before the extrusion.

14. The preparation method of laminated composite materials according to the claim 13 wherein the billets are removed, heated by means outside the die and then replaced.

15. The preparation method of laminated composite materials according to the claim 2 wherein the annealing temperature is in the range of 200-500° C., the holding time is in the range of 5 min-3 h.

* * * * *